(12) United States Patent
Maddukuri et al.

(10) Patent No.: US 9,219,645 B2
(45) Date of Patent: Dec. 22, 2015

(54) SYSTEMS AND METHODS FOR SHARING A SINGLE FIRMWARE IMAGE IN A CHASSIS CONFIGURED TO RECEIVE A PLURALITY OF MODULAR INFORMATION HANDLING SYSTEMS

(71) Applicant: Dell Products L.P., Round Rock, TX (US)

(72) Inventors: Akkiah Choudary Maddukuri, Austin, TX (US); Chandrasekhar Mugunda, Austin, TX (US); Wayne Robert Weilnau, Jr., Austin, TX (US)

(73) Assignee: Dell Products L.P., Round Rock, TX (US)

( * ) Notice: Subject to any disclaimer, the term of this patent is extended or adjusted under 35 U.S.C. 154(b) by 290 days.

(21) Appl. No.: 13/796,833

(22) Filed: Mar. 12, 2013

(65) Prior Publication Data

US 2014/0280790 A1    Sep. 18, 2014

(51) Int. Cl.
*G06F 15/177* (2006.01)
*H04L 12/24* (2006.01)

(52) U.S. Cl.
CPC ............ *H04L 41/0803* (2013.01); *H04L 41/04* (2013.01)

(58) Field of Classification Search
CPC ......... H04L 12/24; H04L 41/08; H04L 41/04; H04L 41/0803
USPC ................... 709/220, 217, 219; 713/1, 2, 100
See application file for complete search history.

(56) References Cited

U.S. PATENT DOCUMENTS

| 6,049,668 | A | 4/2000 | Smith et al. |
| 6,874,100 | B2 * | 3/2005 | Rauscher ..................... 714/6.21 |
| 7,134,007 | B2 * | 11/2006 | Zimmer et al. .................... 713/1 |
| 7,302,547 | B2 * | 11/2007 | Powers et al. ................. 711/209 |
| 7,673,132 | B2 * | 3/2010 | Chu et al. .......................... 713/2 |
| 2007/0186086 | A1 * | 8/2007 | Lambert et al. .................... 713/1 |
| 2008/0126627 | A1 * | 5/2008 | Chandrasekhar et al. ...... 710/62 |
| 2012/0173858 | A1 * | 7/2012 | Ayanam et al. .................... 713/2 |

FOREIGN PATENT DOCUMENTS

WO    2005010771 A1    2/2005

* cited by examiner

*Primary Examiner* — Frantz Jean
(74) *Attorney, Agent, or Firm* — Jackson Walker L.L.P.

(57) ABSTRACT

In accordance with embodiments of the present disclosure, a system may include a chassis configured to receive a plurality of modular information handling systems, wherein each modular information handling system comprises a remote access controller and a management controller disposed in the chassis. The management controller may be configured to be communicatively coupled to one or more remote access controllers of the one or more modular information handling systems received in the chassis and further configured to share a single remote access controller firmware image such that each of the one or more remote access controllers loads and executes the single remote access controller firmware image.

16 Claims, 3 Drawing Sheets

SYSTEMS AND METHODS FOR SHARING A SINGLE FIRMWARE IMAGE IN A CHASSIS CONFIGURED TO RECEIVE A PLURALITY OF MODULAR INFORMATION HANDLING SYSTEMS

TECHNICAL FIELD

The present disclosure relates in general to information handling systems, and more particularly to operation of virtual functions related to modular information handling resources in a chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A system chassis with multiple information handling systems with various peripheral and I/O capabilities common to the chassis as a whole may provide advantages, as it allows a blade server chassis in a small form factor, thereby providing a blade server chassis with a size comparable to the size of a monolithic server. Implementation of a system chassis with multiple information handling systems with various peripheral and I/O capabilities common to the chassis as a whole presents numerous challenges. For example, each of the multiple information handling systems present in the chassis may have their own remote access controller, each of which may include computer-readable media for storing the remote access controller's firmware. The need for multiple instances of computer-readable media for the various remote access controllers may increase system cost and the physical size of the system. In addition, management of multiple copies of firmware among the remote access controllers may result in inconsistent versions of firmware among the remote access controllers.

SUMMARY

In accordance with the teachings of the present disclosure, certain disadvantages and problems associated with maintaining remote access controller firmware have been reduced or eliminated.

In accordance with embodiments of the present disclosure, a system may include a chassis configured to receive a plurality of modular information handling systems, wherein each modular information handling system comprises a remote access controller and a management controller disposed in the chassis. The management controller may be configured to be communicatively coupled to one or more remote access controllers of the one or more modular information handling systems received in the chassis and further configured to share a single remote access controller firmware image such that each of the one or more remote access controllers loads and executes the single remote access controller firmware image.

In accordance with these and other embodiments of the present disclosure, a method may include in a chassis configured to receive a plurality of modular information handling systems each comprising a remote access controller, sharing, by a management controller disposed in the chassis and configured to be communicatively coupled to one or more remote access controllers of the one or more modular information handling systems received in the chassis, a single remote access controller firmware image such that each of the one or more remote access controllers loads and executes the single remote access controller firmware image.

In accordance with these and other embodiments of the present disclosure, an article of manufacture may include a computer readable medium and computer-executable instructions carried on the computer readable medium, the instructions readable by a processor. The instructions, when read and executed, may cause the processor to in a chassis configured to receive a plurality of modular information handling systems each comprising a remote access controller, sharing, by a chassis management controller disposed in the chassis and configured to be communicatively coupled to one or more remote access controllers of the one or more modular information handling systems received in the chassis, a single remote access controller firmware image such that each of the one or more remote access controllers loads and executes the single remote access controller firmware image.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
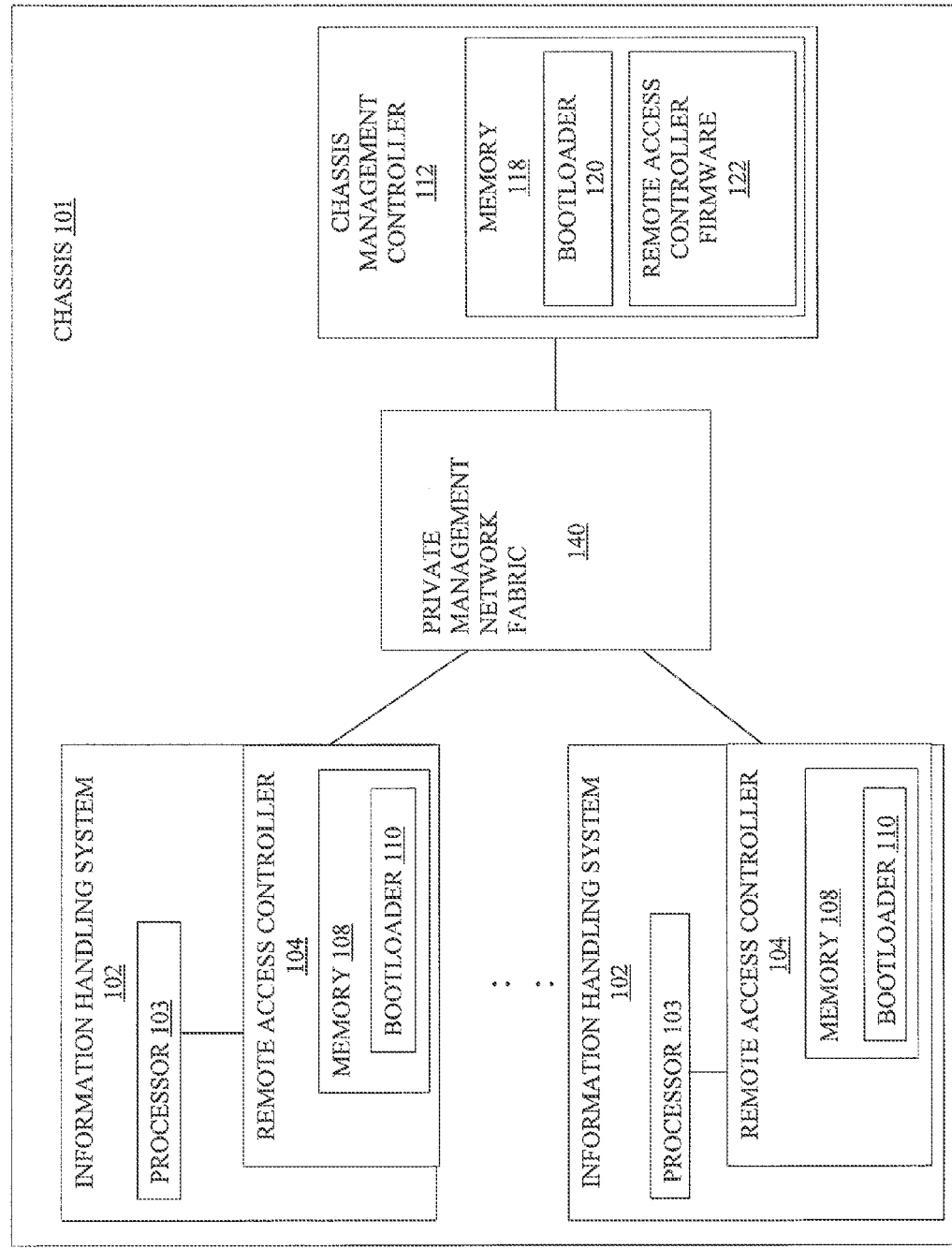
FIG. 1 illustrates a block diagram of an example system chassis with multiple modular information handling systems disposed therein, in accordance with embodiments of the present disclosure.
Figure 2:
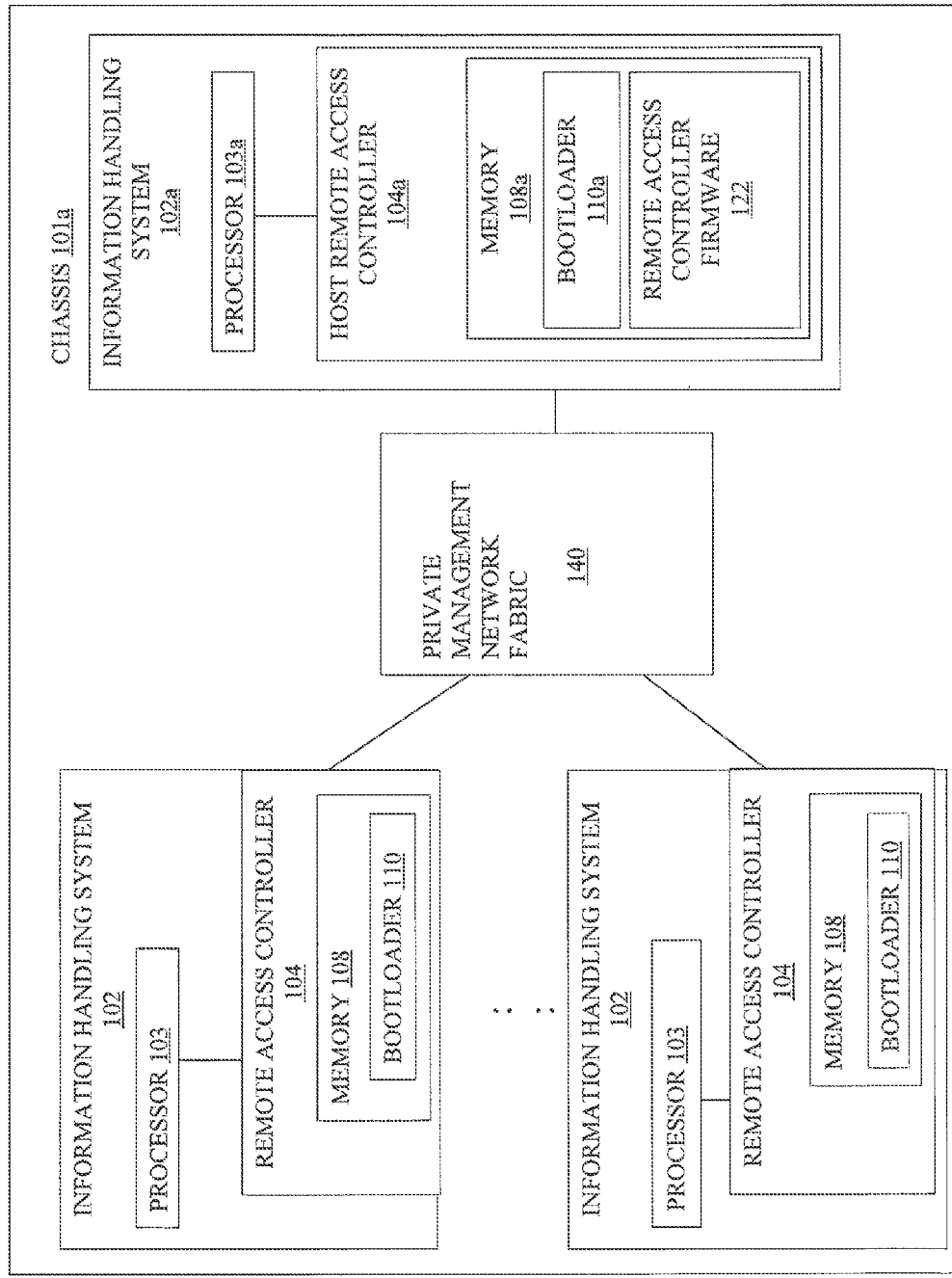
FIG. 2 illustrates a block diagram of another example system chassis with multiple modular information handling systems disposed therein, in accordance with embodiments of the present disclosure.
Figure 3:
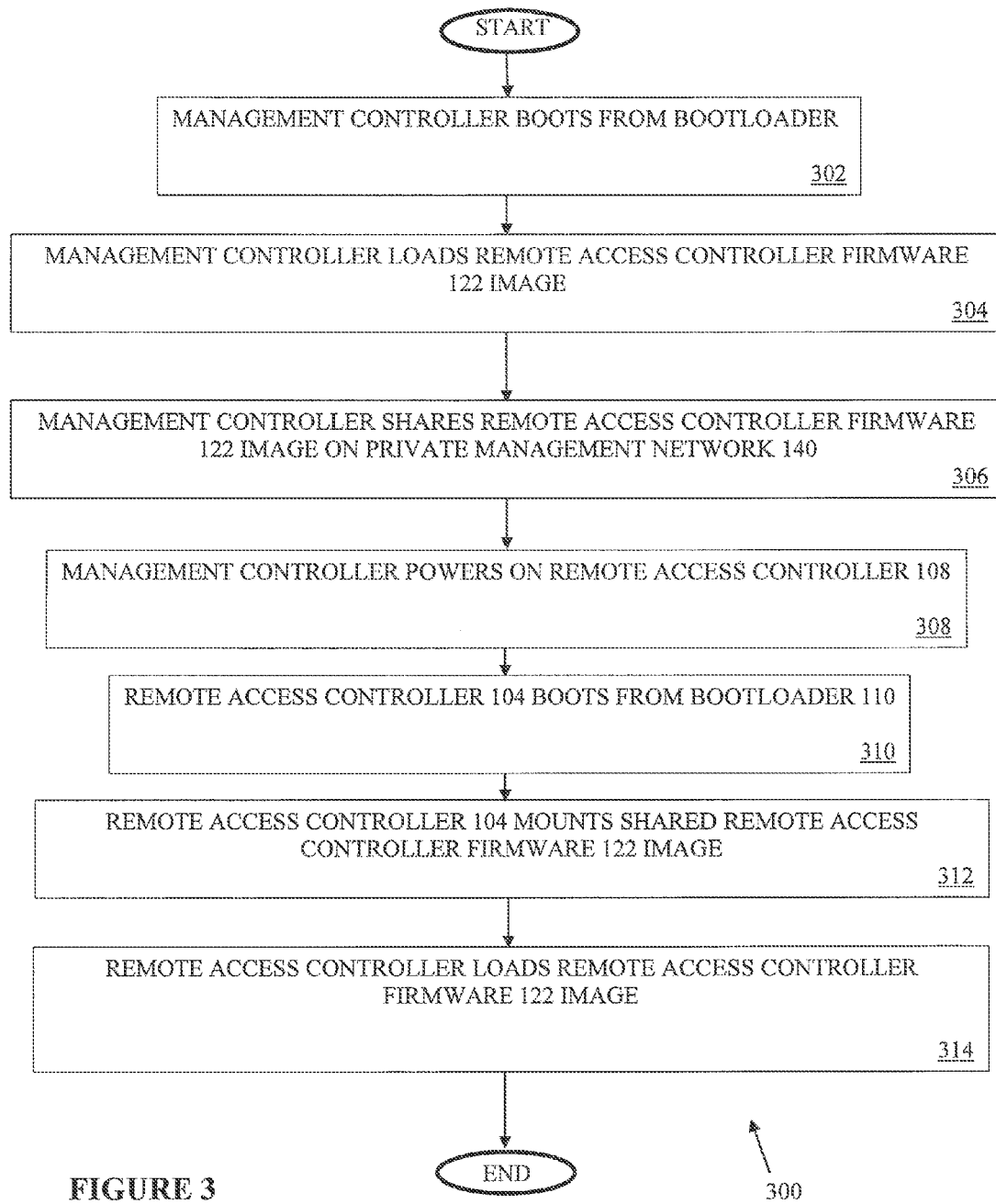
FIG. 3 illustrates a flow chart of an example method for sharing a single firmware image in a chassis configured to receive a plurality of modular information handling systems, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various I/O devices, such as a keyboard, a mouse, and a video display. The information handling system may also include one or more busses operable to transmit communication between the various hardware components.

For the purposes of this disclosure, information handling resources may broadly refer to any component system, device or apparatus of an information handling system, including without limitation processors, busses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

FIG. 1 illustrates a block diagram of an example system 100 comprising a chassis 101 with multiple modular information handling systems 102 disposed therein, in accordance with embodiments of the present disclosure. As depicted in FIG. 1, system 100 may comprise a chassis 101 including a plurality of information handling systems 102, a private management network fabric 140, and a chassis management controller 112. In addition to information handling systems 102, private network management fabric 140, and chassis management controller 112, chassis 101 may include one or more other information handling resources.

An information handling system 102 may generally be operable to receive data from and/or communicate data to one or more information handling resources of chassis 101, including communicating with chassis management controller 112 via private management network fabric 140. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103 and a remote access controller 104. In addition to processor 103 and remote access controller 104, information handling system 102 may include one or more other information handling resources.

A processor 103 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory or other computer-readable media accessible to processor 103.

Information handling system 102 may include a remote access controller 104. Remote access controller 104 may be implemented by, for example, a microprocessor, microcontroller, DSP, ASIC, EEPROM, or any combination thereof. Remote access controller 104 may be configured to communicate with one or more of chassis management controller 112. Such communication may be made, for example, via private management network fabric 140. Remote access controller 140 may be configured to provide out-of-band management facilities for management of information handling system 102. Such management may be made by information handling resources of chassis 101 even if information handling system 102 is powered off or powered to a standby state. Remote access controller 104 may include a processor, memory, and network connection separate from the rest of information handling system 102. In certain embodiments, remote access controller 104 may include or may be an integral part of a baseboard management controller (BMC), Dell Remote Access Controller (DRAC) or an Integrated Dell Remote Access Controller (iDRAC).

As shown in FIG. 1, remote access controller 104 may include memory 108 or have a dedicated memory 108 accessible to it. Memory 108 may include any system, device, or apparatus configured to retain program instructions and/or data for a period of time (e.g., computer-readable media). Memory 108 may include RAM, EEPROM, a PCMCIA card, flash memory, magnetic storage, opto-magnetic storage, or any suitable selection and/or array of volatile or non-volatile memory that retains data after power to information handling system 102 is turned off.

As depicted in FIG. 1, memory 108 may have stored thereon a bootloader 110. Bootloader 110 may include any system, device, or apparatus configured to load an operating system, firmware, and/or runtime environment for remote access controller 104 during a boot or initialization of remote access controller 104. In some embodiments, bootloader 110 may be implemented as a program of instructions that may be read by and executed on remote access controller 104 to carry out the functionality of bootloader 110.

Chassis management controller 112 may comprise any system, device, or apparatus configured to facilitate management and/or control of system 100 embodied by chassis 101, its information handling systems 102, and/or one or more of its component information handling resources. Chassis management controller 112 may be configured to issue commands and/or other signals to manage and/or control an information handling system 102 and/or information handling resources of system 100. Chassis management controller 112 may comprise a microprocessor, microcontroller, DSP, ASIC, field programmable gate array ("FPGA"), EEPROM, or any combination thereof. In some embodiments, chassis management controller 112 may provide a management console for user/administrator access to these functions. For example, chassis management controller 112 may implement Web Services Management ("WS-MAN") or another suitable management protocol permitting a user to remotely access chassis management controller 112 to configure system 100 and its various information handling resources. In such embodiments, chassis management controller 112 may interface with a network interface, thus allowing for "out-of-band" control of system 100, such that communications to and from chassis management controller 112 are communicated via a management channel physically isolated from an "in-band" communication channel of chassis 101 for which non-management communication may take place. Thus, for example, if a failure occurs in system 100 that prevents an administrator from interfacing with system 100 via the in-band communication channel or a user interface associated with chassis 101 (e.g., operating system failure, power failure, etc.), the administrator may still be able to monitor and/or manage system 100 (e.g., to diagnose problems that may have caused failure) via chassis management controller 112. In the same or alternative embodiments, chassis management controller 112 may allow an administrator to remotely manage one or more parameters associated with operation of system 100 and its various information handling resources (e.g., power usage, processor allocation, memory allocation, security privileges, etc.).

As shown in FIG. 1, chassis management controller 112 may include memory 118 or have a dedicated memory 118 accessible to it. Memory 118 may include any system, device, or apparatus configured to retain program instructions and/or data for a period of time (e.g., computer-readable media). Memory 118 may include RAM, EEPROM, a PCMCIA card, flash memory, magnetic storage, opto-magnetic storage, or any suitable selection and/or array of volatile or non-volatile memory that retains data after power to chassis 101 is turned off.

As depicted in FIG. 1, memory 118 may have stored thereon a bootloader 120. Bootloader 120 may include any system, device, or apparatus configured to load an operating system, firmware, and/or runtime environment for chassis management controller 112 during a boot or initialization of chassis management controller 112. In some embodiments, bootloader 120 may be implemented as a program of instructions that may be read by and executed on chassis management controller 112 to carry out the functionality of bootloader 120.

As shown in FIG. 1, memory 118 may also have stored thereon remote access controller firmware 122. Remote access controller firmware 122 may comprise a program of instructions that may be read and executed on a remote access controller 104 to carry out the functionality of such remote access controller 104. In some embodiments, remote access controller firmware 122 may be compatible with, and therefore executable by, each remote access controller 104 integral to chassis 101.

Private management network fabric 140 may comprise a network and/or fabric configured to couple information handling systems 102 (e.g., via remote access controller 104) and chassis management controller 112 to each other and/or one or more other information handling resources of chassis 101. In these and other embodiments, private management network fabric 140 may include a communication infrastructure, which provides physical connections, and a management layer, which organizes the physical connections and information handling resources communicatively coupled to private management network fabric 140. Private management network fabric 140 may be implemented as, or may be a part of, an Ethernet local area network (LAN) or any other appropriate architecture or system that facilitates the communication of signals, data, and/or messages.

In operation, chassis management controller 112 may share the full image for remote access controller firmware 122 via private management network fabric 140. Bootloader 110 of each remote access controller 104 may load the full image for remote access controller firmware 122 from the shared image. Accordingly, a single firmware image may be maintained at or by chassis management controller 112, thus decreasing hardware requirements and management complexity associated with maintaining individual firmware images for each remote access controller 104. For example, the systems and methods herein will thus allow a user to update firmware for all remote access controllers 104 within chassis 101 by updating a single information handling resource (e.g., chassis management controller 112).

FIG. 2 illustrates a block diagram of another example system 200 comprising a chassis 101a with multiple modular information handling systems 102 and 102a disposed therein, in accordance with embodiments of the present disclosure. System 200 is similar to system 100 depicted in FIG. 1, except that in system 200, remote access controller firmware 122 is stored on a host remote access controller 104a of a modular information handling system 102a disposed in chassis 101a. Thus, in operation, host remote access controller 104a may share the full image for remote access controller firmware 122 via private management network fabric 140. Bootloader 110 of each remote access controller 104 may load the full image for remote access controller firmware 122 from the shared image. Accordingly, a single firmware image may be maintained at or by remote access controller 104a, thus decreasing hardware requirements and management complexity associated with maintaining individual firmware images for each remote access controller 104 and 104a. For example, the systems and methods herein will thus allow a user to update firmware for all remote access controllers 104 within chassis 101 by updating a single information handling resource (e.g., host remote access controller 104a).

As used herein, the term "management controller" may broadly refer to either or both of a remote access controller (e.g., host remote access controller 104a) and a chassis management controller (e.g., chassis management controller 112).

FIG. 3 illustrates a flow chart of an example method 300 for sharing a single firmware image 122 in a chassis configured to receive a plurality of modular information handling systems, in accordance with embodiments of the present disclosure. According to some embodiments, method 300 may begin at step 302. As noted above, teachings of the present disclosure may be implemented in a variety of configurations of system 100 and system 200. As such, the preferred initialization point for method 300 and the order of the steps comprising method 300 may depend on the implementation chosen.

At step 302, a management controller (e.g., chassis management controller 112 or host remote access controller 104a) may initialize by booting from a bootloader (e.g., bootloader 110a or bootloader 120). At step 304, the management controller may load the image for remote access controller firmware 122. At step 306, the management controller may share the image for remote access controller firmware 122 on private management network fabric 140.

At step 308, the management controller may power on a remote access controller 108 (e.g., by communicating an appropriate hardware signal via private management network fabric 140). At step 310, such remote access controller 104 may boot from bootloader 110. At step 312, remote access controller 104 may mount the image for the shared remote access controller firmware 122 (e.g., such that the image appears to remote access controller 104 as a volume or other storage resource available to remote access controller 104). At step 314, remote access controller 104 may load remote access controller firmware 122, which may provide a full feature set of remote access controller 104. After completion of step 314, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using system 100, system 200, and/or any other system operable to implement method 300. In certain embodiments, method 300 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A system comprising:
   a chassis configured to receive a plurality of modular information handling systems, wherein each modular information handling system comprises a remote access controller; and
   a management controller disposed in the chassis and configured to be communicatively coupled to one or more remote access controllers of the one or more modular information handling systems received in the chassis and further configured to share a single remote access controller firmware image such that each of the one or more remote access controllers loads and executes the single remote access controller firmware image.

2. The system of claim 1, further comprising a private management network fabric disposed in the chassis and configured to communicatively couple the management controller to the one or more remote access controllers.

3. The system of claim 2, the management controller configured to share the single firmware image via the private management network fabric.

4. The system of claim 2, the private management network fabric comprising an Ethernet local area network.

5. The system of claim 1, wherein the management controller is a chassis management controller.

6. The system of claim 1, wherein the management controller is a remote access controller.

7. A method comprising:
   in a chassis configured to receive a plurality of modular information handling systems each comprising a remote access controller, sharing, by a management controller disposed in the chassis and configured to be communicatively coupled to one or more remote access controllers of the one or more modular information handling systems received in the chassis, a single remote access controller firmware image such that each of the one or more remote access controllers loads and executes the single remote access controller firmware image.

8. The method of claim 7, wherein the management controller and the one or more remote access controllers are communicatively coupled via a private management network fabric disposed in the chassis.

9. The method of claim 8, wherein sharing comprises sharing the single firmware image via the private management network fabric.

10. The method of claim 8, the private management network fabric comprising an Ethernet local area network.

11. The method of claim 7, wherein the management controller is a chassis management controller.

12. The method of claim 7, wherein the management controller is a remote access controller.

13. An article of manufacture comprising:
    a non-transitory computer readable medium; and
    computer-executable instructions carried on the computer readable medium, the instructions readable by a processor, the instructions, when read and executed, for causing the processor to:
    in a chassis configured to receive a plurality of modular information handling systems each comprising a remote access controller, sharing, by a chassis management controller disposed in the chassis and configured to be communicatively coupled to one or more remote access controllers of the one or more modular information handling systems received in the chassis, a single remote access controller firmware image such that each of the one or more remote access controllers loads and executes the single remote access controller firmware image.

14. The article of claim 13, wherein the chassis management controller and the one or more remote access controllers are communicatively coupled via a private management network fabric disposed in the chassis.

15. The article of claim 14, wherein sharing comprises sharing the single firmware image via the private management network fabric.

16. The article of claim 14, the private management network fabric comprising an Ethernet local area network.

* * * * *